United States Patent
Yamamoto et al.

(10) Patent No.: US 11,274,701 B2
(45) Date of Patent: Mar. 15, 2022

(54) ROLLING BEARING AND CAGE

(71) Applicant: JTEKT CORPORATION, Osaka (JP)

(72) Inventors: Yuya Yamamoto, Osaka (JP); Shota Akimoto, Osaka (JP)

(73) Assignee: JTEKT CORPORATION, Osaka (JP)

(*) Notice: Subject to any disclaimer, the term of this patent is extended or adjusted under 35 U.S.C. 154(b) by 0 days.

(21) Appl. No.: 17/086,574

(22) Filed: Nov. 2, 2020

(65) Prior Publication Data

US 2021/0140476 A1    May 13, 2021

(30) Foreign Application Priority Data

Nov. 8, 2019  (JP) .............................. JP2019-203171

(51) Int. Cl.
  *F16C 33/41*    (2006.01)
  *F16C 33/66*    (2006.01)
  *F16C 33/38*    (2006.01)
  *F16C 19/16*    (2006.01)

(52) U.S. Cl.
  CPC ........ *F16C 33/416* (2013.01); *F16C 33/3806* (2013.01); *F16C 33/6614* (2013.01); *F16C 19/16* (2013.01); *F16C 33/3887* (2013.01)

(58) Field of Classification Search
  CPC .... F16C 33/3806; F16C 33/41; F16C 33/412; F16C 33/414; F16C 33/416; F16C 33/418; F16C 33/6614; F16C 33/3887; F16C 19/16
  See application file for complete search history.

(56) References Cited

U.S. PATENT DOCUMENTS

| | | | |
|---|---|---|---|
| 6,533,462 B2 * | 3/2003 | Kawakami | F16C 33/414 384/470 |
| 10,527,095 B1 * | 1/2020 | Roffe | F16C 33/3862 |
| 2002/0126927 A1 * | 9/2002 | Compassi | F16C 33/416 384/470 |
| 2017/0204901 A1 * | 7/2017 | Kamamoto | F16C 33/3806 |
| 2017/0268570 A1 * | 9/2017 | Kamamoto | F16C 33/3806 |

FOREIGN PATENT DOCUMENTS

| | | | | |
|---|---|---|---|---|
| JP | 11210757 A | * | 8/1999 | ............ F16C 33/416 |
| JP | 2001082486 A | * | 3/2001 | ............ F16C 33/418 |
| JP | 2003-35317 A | | 2/2003 | |

OTHER PUBLICATIONS

Machine Translation of JP-11210757-A (Year: 1999).*

* cited by examiner

*Primary Examiner* — Alan B Waits
(74) *Attorney, Agent, or Firm* — Oliff PLC

(57) ABSTRACT

A rolling bearing includes an inner ring, an outer ring, a plurality of rolling elements, and a cage. The cage includes an annular body placed closer to the first side in the axial direction than the rolling elements, and a plurality of cage prongs provided to extend to the second side in the axial direction from the annular body. The cage prong includes a lack portion provided from the first side to the second side in the axial direction such that the lack portion is opened to the second side in the axial direction and along the radial direction. The cage prong includes a pair of cage prong bodies such that the cage prong bodies are provided on both sides of the lack portion in the circumferential direction and make contact with a corresponding one of the rolling elements, and a stiffening rib is provided between the cage prong bodies.

4 Claims, 6 Drawing Sheets

ROLLING BEARING AND CAGE

CROSS-REFERENCE TO RELATED APPLICATION

This application claims priority to Japanese Patent Application No. 2019-203171 filed on Nov. 8, 2019, incorporated herein by reference in its entirety.

BACKGROUND

1. Technical Field

The present disclosure relates to a rolling bearing and a cage.

2. Description of Related Art

A rolling bearing includes an inner ring, an outer ring, a plurality of rolling elements provided between the inner ring and the outer ring, and an annular cage. In a case of a ball bearing the rolling element of which is a ball, a so-called snap cage made of resin is used. A rolling bearing that uses a snap cage has such an advantage that a region (non-stirring region) where lubricant such as grease is not stirred is large and shearing of the grease is restrained. Japanese Unexamined Patent Application Publication No. 2003-35317 (JP 2003-35317 A) describes a rolling bearing including a snap cage.

SUMMARY

The snap cage includes an annular body placed closer to a first side in the axial direction than rolling elements, and a plurality of cage prongs. The cage prongs are provided to extend to a second side in the axial direction from the annular body. Accordingly, when the rolling bearing rotates, distal-end-side portions of the cage prongs deform toward an outer ring side due to centrifugal force. Particularly, when the rotation speed of the rolling bearing is high, there is such a possibility that the cage prongs partially make contact with the outer ring, and the cage is worn unevenly.

In view of this, an object of this disclosure is to achieve a cage the cage prongs of which are hard to deform against centrifugal force and to prevent a decrease in the strength of the cage prongs.

A rolling bearing according to a first aspect of this disclosure includes an inner ring, an outer ring, a plurality of rolling elements, and an annular cage. The rolling elements are provided between the inner ring and the outer ring. In the cage, the rolling elements are held at intervals in the circumferential direction of the cage. The cage includes an annular body placed closer to a first side in the axial direction of the cage than the rolling elements, and a plurality of cage prongs provided to extend to a second side in the axial direction from the annular body. Each of the cage prongs includes a lack portion provided from a first side of the each of the cage prongs to a second side of the each of the cage prongs in the axial direction such that the lack portion is opened to the second side in the axial direction and along a radial direction of the cage. The each of the cage prongs includes a pair of cage prong bodies such that the cage prong bodies are provided on both sides of the lack portion in the circumferential direction and make contact with a corresponding one of the rolling elements. A stiffening rib is provided between the cage prong bodies.

In this rolling bearing, the lack portion is formed in the cage prong, so that the weight of the cage prong is reduced, thereby making it possible to decrease centrifugal force to be applied to the cage. When the rolling bearing rotates, the rolling element makes contact with the cage prong from the circumferential direction. Although the strength of the cage prong decreases due to the lack portion, the stiffening rib can prevent a decrease in the strength of the cage prong. Thus, the cage prong can hardly deform due to the centrifugal force by reducing the weight of the cage prong, and the decrease in the strength of the cage prong can be prevented by the stiffening rib.

Further, in the above aspect, the inner ring may include an inner ring raceway with which balls as the rolling elements make rolling contact, and the cage may include guide portions configured to position the cage by making contact with the inner ring raceway. In this configuration, since the balls make rolling contact with the inner ring raceway, machining such as grinding is performed on the inner ring raceway, for example. When the guide portions are brought into contact with the inner ring raceway configured as such, the cage is stably guided.

Further, in the above aspect, the stiffening rib may be provided at a position closer to the inner side in the radial direction between the cage prong bodies. In this configuration, in comparison with a case where the stiffening rib is provided at a position closer to the outer side in the radial direction, the volume of the lack portion can be made large. This heightens an effect to reduce the weight of the cage prong.

Further, in the above aspect, the stiffening rib may include a first rib portion provided on the first side in the axial direction and connecting the annular body to the cage prong bodies, and a pair of second rib portions provided at an interval in the circumferential direction so as to extend to the second side in the axial direction from the first rib portion, the second rib portions being connected to the cage prong bodies. In this configuration, a part of the stiffening rib between the second rib portions is lacked, so that an increase in weight by the stiffening rib can be restrained. Besides, the cage prong bodies are connected to the annular body via the first rib portion and the second rib portions, so that the stiffening rib can sufficiently have a function as a stiffener for the cage prong bodies.

Further, a cage according to a second aspect of this disclosure includes an annular body and a plurality of cage prongs. The annular body is placed closer to a first side in the axial direction of the cage than rolling elements provided in a rolling bearing. The cage prongs are provided to extend to a second side in the axial direction from the annular body. Each of the cage prongs includes a lack portion provided from a first side of the each of the cage prongs to a second side of the each of the cage prongs in the axial direction such that the lack portion is opened to the second side in the axial direction and along the radial direction of the cage. The each of the cage prongs includes a pair of cage prong bodies such that the cage prong bodies are provided on both sides of the lack portion in the circumferential direction of the cage and make contact with a corresponding one of the rolling elements. A stiffening rib is provided between the cage prong bodies.

In the cage, the lack portion is formed in the cage prong. Accordingly, the weight of the cage prong is reduced, thereby making it possible to decrease centrifugal force to be applied to the cage. When the rolling bearing including the cage rotates, the rolling element makes contact with the cage prong from the circumferential direction. Although the strength of the cage prong decreases due to the lack portion, the stiffening rib can prevent a decrease in the strength of the cage prong. Thus, the cage prong can hardly deform due to the centrifugal force by reducing the weight of the cage prong, and the decrease in the strength of the cage prong can be prevented by the stiffening rib.

With the aspects of this disclosure, the cage prongs of the cage can hardly deform, and the decrease in the strength of the cage prongs can be prevented.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
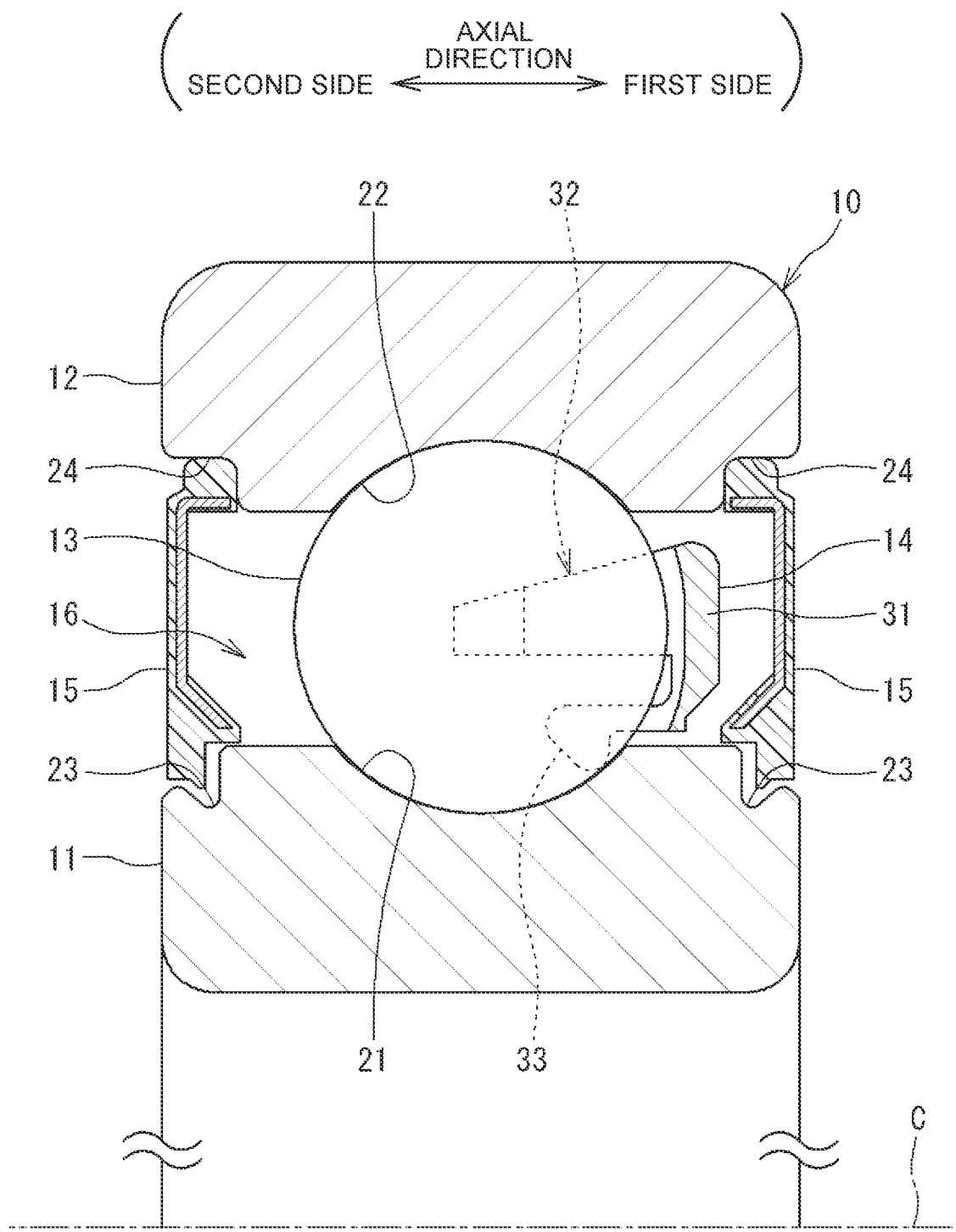
FIG. 1 is a sectional view of a rolling bearing.

FIG. 1 is a sectional view of a rolling bearing. The rolling bearing 10 illustrated in FIG. 1 includes an inner ring 11, an outer ring 12, a plurality of rolling elements provided between the inner ring 11 and the outer ring 12, and an annular cage 14. The rolling elements in this disclosure are balls 13, and the rolling bearing 10 is a ball bearing (deep groove ball bearing). FIG. 1 illustrates a section including a center line C (also referred to as a "bearing center line C") of the rolling bearing 10.

In this disclosure, a direction along the center line C of the rolling bearing 10 corresponds to the axial direction of the rolling bearing 10 and is just referred to as the "axial direction." The axial direction also includes a direction parallel to the center line C. The right side in FIG. 1 is defined as a first side in the axial direction, and the left side in FIG. 1 is defined as a second side in the axial direction. A direction perpendicular to the bearing center line C corresponds to the radial direction of the rolling bearing 10 and is just referred to as the "radial direction." A direction where the rolling bearing 10 (the inner ring 11 in this disclosure) rotates around the bearing center line C corresponds to the circumferential direction of the rolling bearing 10 and is just referred to as the "circumferential direction."

The rolling bearing 10 illustrated in FIG. 1 further includes seals 15 on both sides in the axial direction. The seals 15 prevent lubricant such as grease in an annular space 16 (also referred to as "bearing inside") formed between the inner ring 11 and the outer ring 12 from leaking outside (bearing outside). Further, the seals 15 also have a function to prevent foreign matter in the bearing outside from entering the bearing inside.

The inner ring 11 is an annular member, and an inner ring raceway 21 with which the balls 13 make rolling contact is formed in the outer periphery of the inner ring 11. In the section illustrated in FIG. 1, the inner ring raceway 21 is constituted by a groove formed in a recessed arcuate shape having a radius slightly larger than the radius of the balls 13. Respective recessed grooves 23 are formed on respective outer peripheral surfaces of both side portions of the inner ring 11 in the axial direction. The recessed grooves 23 face respective inner peripheral portions of the seals 15 via respective gaps. Labyrinth gaps are formed by the gaps.

The outer ring 12 is an annular member, and an outer ring raceway 22 with which the balls 13 make rolling contact is formed on the inner periphery of the outer ring 12. In the section illustrated in FIG. 1, the outer ring raceway 22 is constituted by a groove formed in a recessed arcuate shape having a radius slightly larger than the radius of the balls 13. Respective sealing grooves 24 are formed on respective inner peripheral surfaces of both side portions of the outer ring 12 in the axial direction. Respective outer peripheral portions of the seals 15 are attached to the sealing grooves 24.

The balls 13 are provided between the inner ring raceway 21 and the outer ring raceway 22. When the rolling bearing 10 (the inner ring 11) rotates, the balls 13 roll on the inner ring raceway 21 and the outer ring raceway 22.

Figure 2:
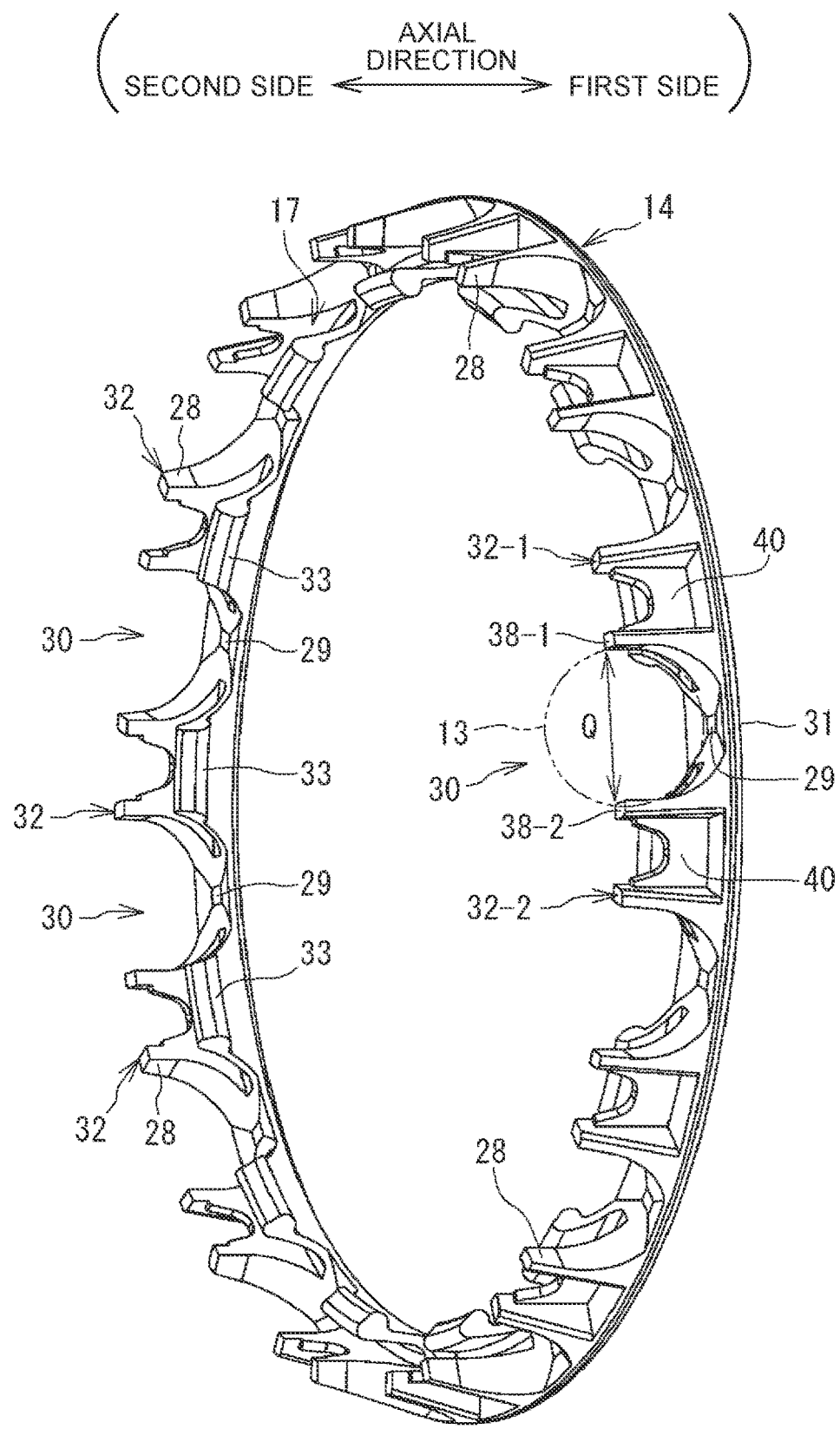
FIG. 2 is a perspective view of a cage.
Figure 3:
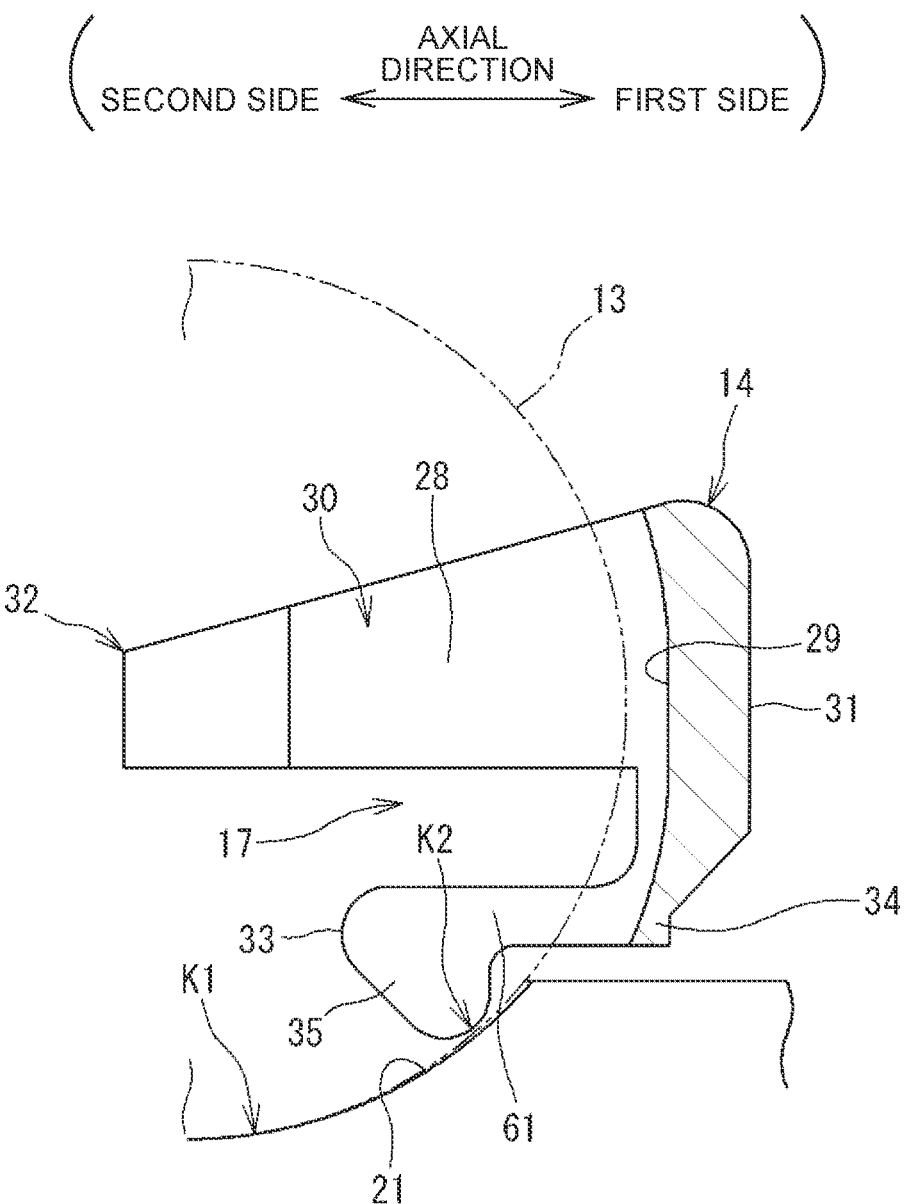
FIG. 3 is a sectional view illustrating the cage and its peripheral area.

FIG. 2 is a perspective view of the cage 14. FIG. 3 is a sectional view illustrating the cage 14 and its peripheral area. The cage 14 includes an annular body (annular portion) 31 and a plurality of cage prongs (pillar portions) 32. The cage 14 in this disclosure further includes guide portions 33. The annular body 31 is a part having an annular shape and is placed closer to the first side in the axial direction than the balls 13. All the cage prongs 32 have the same shape. The cage prongs 32 are provided to extend to the second side in the axial direction from the annular body 31. The guide portions 33 are provided inward of the cage prongs 32 in the radial direction. A gap 17 in the radial direction is provided between the cage prong 32 and the guide portion 33. A space between the cage prongs 32 provided in a pair so as to be adjacent to each other in the circumferential direction, the space being formed on the second side in the axial direction from the annular body 31, serves as a pocket 30 in which the ball 13 is stored. A plurality of pockets 30 is formed along the circumferential direction.

Hereby, the cage 14 can hold the balls 13 at intervals in the circumferential direction. A part (a cage prong body 38 (described later)) of the cage prong 32, the part having a surface 28 facing the circumferential direction, serves as a first part of the pocket 30. The ball 13 can make contact with the surface 28. A part of the annular body 31, the part having a surface 29 facing the second side in the axial direction, serves as a second part of the pocket 30. The ball 13 can make contact with the surface 29. The cage 14 is made of resin (synthetic resin) such as polyamide, for example, and is manufactured by injection molding. The annular body 31, the cage prongs 32, and the guide portions 33 are molded integrally, and the cage 14 is constituted by a single member.

The following further describes the guide portion 33. The guide portion 33 is provided to extend from a radially inner part 34 (see FIG. 3) of the annular body 31 toward the second side in the axial direction. The guide portion 33 includes a guide portion body 61 connected to the annular body 31 and a projecting portion 35 provided on the inner side, in the radial direction, of a second-side part of the guide portion body 61 in the axial direction. The projecting portion 35 projects toward the inner ring 11 side. Part of the projecting portion 35 can make contact with the inner ring raceway 21.

In a state where the center line of the cage 14 coincides with the bearing center line C (in a state of FIG. 3), a gap is formed between the projecting portion 35 and the inner ring raceway 21. When the cage 14 is displaced in the radial direction from this state, the projecting portion 35 radially makes contact with the inner ring raceway 21. Hereby, the displacement of the cage 14 in the radial direction is restricted. When the cage 14 is displaced to the first side in the axial direction from the state of FIG. 3, the projecting portion 35 makes contact with the inner ring raceway 21 from the axial direction. Hereby, the displacement of the cage 14 to the first side in the axial direction is restricted. Note that, when the cage 14 is displaced to the second side in the axial direction from the state of FIG. 3, the surface 29 of the annular body 31 makes contact with the ball 13. Hereby, the displacement of the cage 14 to the second side in the axial direction is restricted.

Thus, the guide portion 33 has a function to restrict the movement of the cage 14 in the radial direction and the axial direction. That is, the guide portion 33 positions the cage 14 by making contact with the inner ring raceway 21. When the guide portion 33 makes contact (slide contact) with the inner ring raceway 21, the rotation of the cage 14 is guided. That is, the cage 14 in this disclosure serves as a raceway-guide cage (inner-ring-raceway guide cage).

Figure 4:
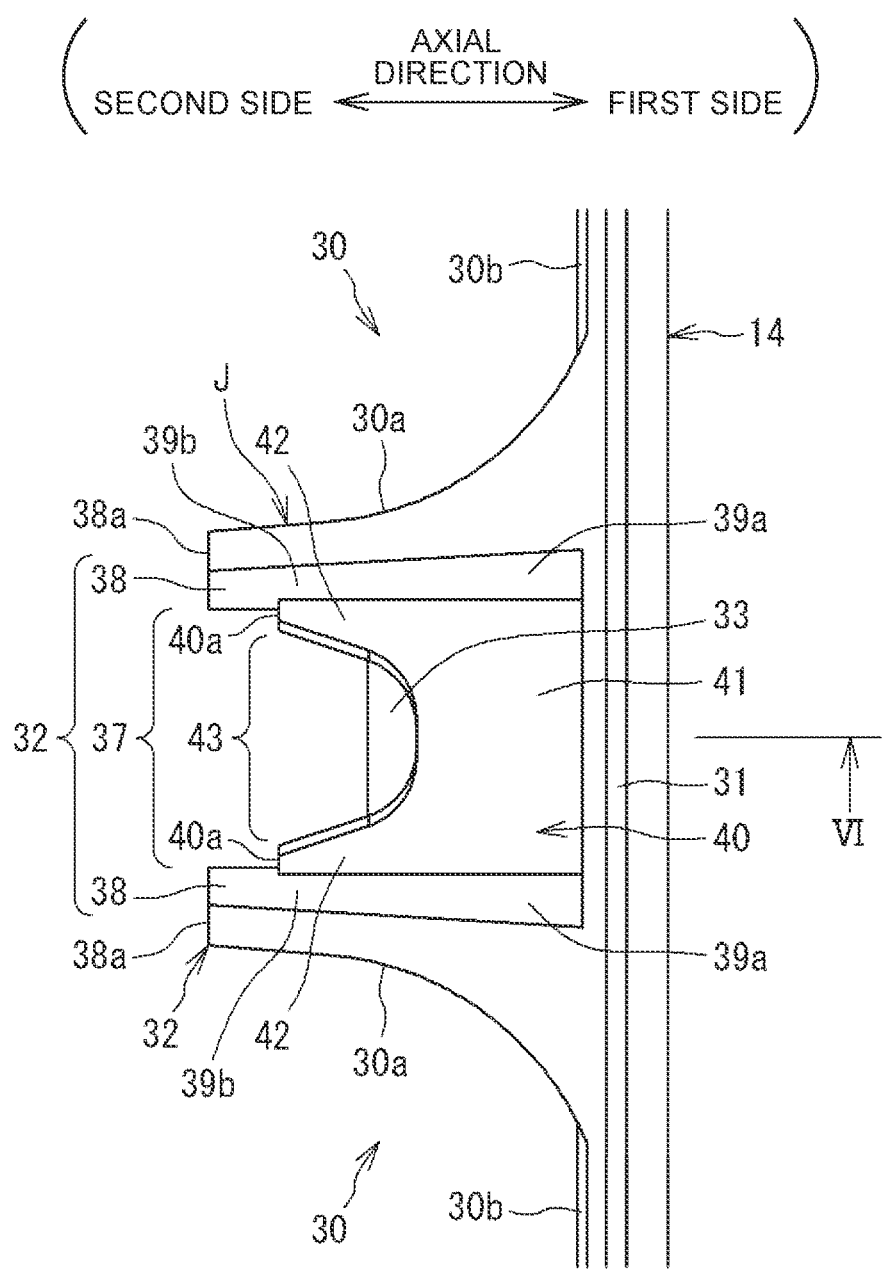
FIG. 4 is an enlarged view of part of the cage viewed from outside in the radial direction.
Figure 5:
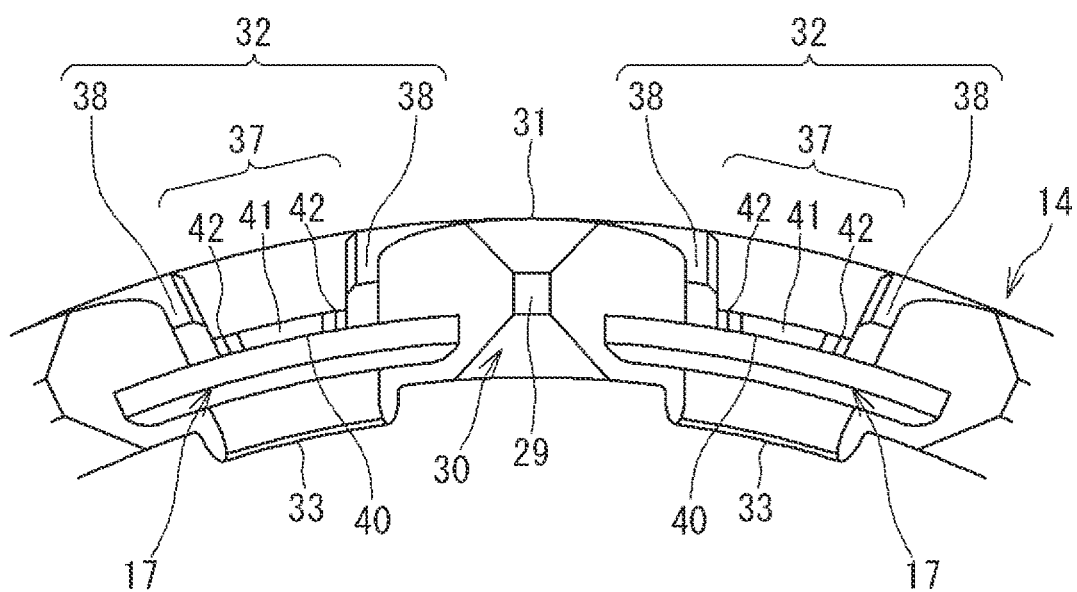
FIG. 5 is an enlarged view of part of the cage viewed from the second side in the axial direction.
Figure 6:
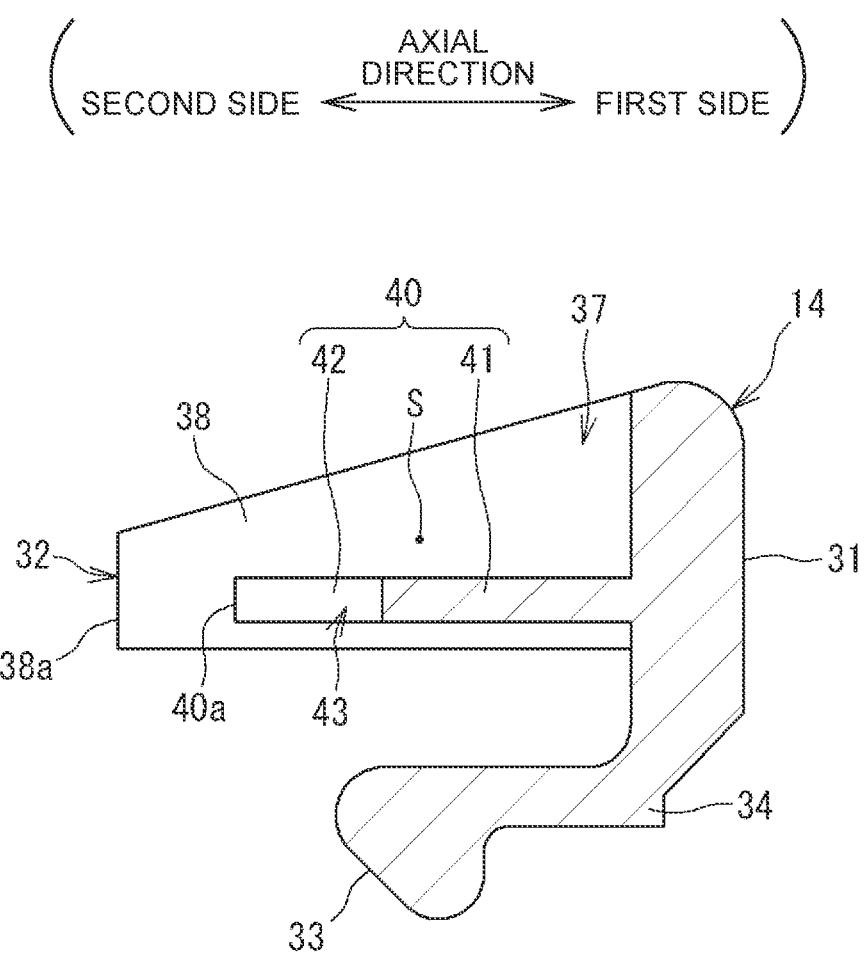
FIG. 6 is a sectional view taken along an arrow VI in FIG. 4.

FIG. 4 is an enlarged view of part of the cage 14 viewed from outside in the radial direction. FIG. 5 is an enlarged view of part of the cage 14 viewed from the second side in the axial direction. The cage prong 32 includes a lack portion 37. The lack portion 37 is provided from the first side of the cage prong 32 to the second side thereof in the axial direction such that the lack portion 37 is opened to the second side in the axial direction and along the radial direction. In this disclosure, a stiffening rib 40 is provided at a position closer to the inner side of the cage prong 32 in the radial direction (see FIG. 6), and therefore, the lack portion 37 is opened to the second side in the axial direction and to the outer side in the radial direction, as will be described later. FIG. 6 is a sectional view along an arrow VI in FIG. 4.

Since the lack portion 37 is provided, the cage prong 32 includes a pair of cage prong bodies (pillar bodies) 38 such that the cage prong bodies 38 are provided on both sides of the lack portion 37 in the circumferential direction (see FIG. 4). Each of the cage prong bodies 38 constitutes a first part 30a of the pocket 30, the first part 30a making contact with the ball 13. Note that a remaining second part 30b of the pocket 30 is constituted by the annular body 31. The stiffening rib 40 is provided between the cage prong bodies 38. The stiffening rib 40 is provided in part of the lack portion 37. The stiffening rib 40 has a plate shape having a radial dimension smaller than that of the cage prong body 38.

In FIG. 4, the stiffening rib 40 includes a first rib portion 41 and a pair of second rib portions 42. The first rib portion 41 is provided on the first side of the lack portion 37 in the axial direction and connects the annular body 31 to respective parts 39a of the cage prong bodies 38 on the first side in the axial direction. The second rib portions 42 are provided at an interval in the circumferential direction. The second rib portions 42 are parts provided to extend to the second side in the axial direction from the first rib portion 41 and are connected to respective parts 39b of the cage prong bodies 38 on the second side in the axial direction.

As described above, the second rib portions 42 are provided at an interval in the circumferential direction. Accordingly, a part between the second rib portions 42 is lacked. The part thus lacked is referred to as a "notch portion 43." As illustrated in FIG. 4, when the stiffening rib 40 is viewed from the outer side in the radial direction, the notch portion 43 has a reassessed shape that does not have corners. Because of this, the notch portion 43 makes it hard to cause stress concentration on the stiffening rib 40.

The stiffening rib 40 is provided at a position closer to the inner side in the radial direction between the cage prong bodies 38 (see FIG. 6). The stiffening rib 40 is provided radially inward of a center S, in the radial direction, of the cage prong body 38.

A side face 40a of the stiffening rib 40 on the second side in the axial direction is present closer to the annular body 31 side than the side face 38a of the cage prong body 38 on the second side in the axial direction. As illustrated in FIG. 4, at least part of the stiffening rib 40 (the second rib portion 42) is provided in a part of a region opposite, across the cage prong body 38, to a region J where the ball 13 makes contact with the cage prong body 38.

Now, focus on the cage prongs 32 provided on both sides in the circumferential direction across one pocket 30 in which the ball 13 is stored in FIG. 2. One of the cage prongs 32 is referred to as a first cage prong 32-1, and the other one of them is referred to as a second cage prong 32-2. A distance Q between respective distal ends, on the second side in the axial direction, of the cage prongs 32-1, 32-2 provided in a pair so as to be adjacent to each other in the circumferential direction is larger than the diameter of the ball 13.

This will be described more specifically as follows. The first cage prong 32-1 includes a pair of cage prong bodies 38, and a reference sign "38-1" is assigned to the cage prong body 38 on the second cage prong 32-2 side out of the cage prong bodies 38 in FIG. 2. The second cage prong 32-2 also includes a pair of cage prong bodies 38, and a reference sign "38-2" is assigned to the cage prong body 38 on the first cage prong 32-1 side out of the cage prong bodies 38 in FIG. 2. The distance Q between a distal end of the first cage prong body 38-1 on the second side in the axial direction and a distal end of the second cage prong body 38-2 on the second side in the axial direction across the one pocket 30 in which the ball 13 is stored is larger than the diameter of the ball 13.

In the above configuration, when the cage 14 is to be displaced to the first side in the axial direction, the displacement of the cage 14 is not restricted by the ball 13. In view of this, the guide portion 33 of the cage 14 can axially make contact with the inner ring raceway 21, as described above. On this account, the cage 14 does not fall off from between the inner ring 11 and the outer ring 12.

Note that, in a case of a general deep groove ball bearing, a so-called snap cage is used. The snap cage includes a detent portion on a distal end side of a cage prong, and the distance between detent portions of cage prongs provided in a pair so as to be adjacent to each other in the circumferential direction is smaller than the diameter of a ball. In this configuration, an axial movement of the snap cage is restricted by the ball, so that the cage does not fall off from between an inner ring and an outer ring. Differently from such a snap cage, the cage 14 in this disclosure is not provided with the detent portions the distance between which is smaller than the diameter of the ball, the detent portions being provided in the general snap cage. Since the detent portions are not provided, the cage 14 in this disclosure is reduced in weight.

As described above, the cage 14 provided in the rolling bearing 10 in this disclosure includes the annular body 31 placed closer to the first side in the axial direction than the balls 13, and the cage prongs 32 provided to extend to the second side in the axial direction from the annular body 31. Each of the cage prongs 32 includes the lack portion 37. The lack portion 37 is provided from the first side of the cage prong 32 to the second side thereof in the axial direction such that the lack portion 37 is opened to the second side in the axial direction and along the radial direction. Since the lack portion 37 is provided, the cage prongs 32 each include a pair of cage prong bodies 38 such that the cage prong bodies 38 are provided on both sides of the lack portion 37 in the circumferential direction. The stiffening rib 40 is provided between the cage prong bodies 38.

In the rolling bearing 10 (the cage 14), since the lack portion 37 is formed in the cage prong 32, the weight of the cage prong 32 is reduced, thereby making it possible to decrease centrifugal force to be applied to the cage 14. Each of the cage prong bodies 38 constitutes the first part of the pocket 30, the first part making contact with the ball 13. On this account, when the rolling bearing 10 rotates, the ball 13 makes contact with the cage prong 32 (the cage prong body 38) from the circumferential direction due to movement delay or the like. The strength of the cage prong 32 decreases due to the lack portion 37, but the stiffening rib 40 can prevent the decrease in the strength of the cage prong 32. That is, the rigidity, in the circumferential direction, of the cage prong 32 provided with the lack portion 37 is increased by the stiffening rib 40. As such, the cage prong 32 can hardly deform by the centrifugal force by reducing the weight of the cage prong 32, and the decrease in the strength of the cage prong 32 can be prevented by the stiffening rib 40.

In the rolling bearing 10 in this disclosure, the cage 14 includes the guide portions 33. The guide portions 33 position the cage 14 such that the projecting portions 35 provided in the guide portions 33 make contact with the inner ring raceway 21. That is, the guide portions 33 restrict the movement of the cage 14 in the radial direction and the axial direction and guide the rotation of the cage 14. Since the balls 13 make rolling contact with the inner ring raceway 21, machining such as grinding is performed on the inner ring raceway 21, for example. When the guide portions 33 are brought into contact with the inner ring raceway 21 configured as such, the cage 14 is stably guided.

Since the rotation of the cage 14 is guided by the inner ring 11, the cage 14 is placed closer to the inner ring 11. This makes it possible to decrease the radius of the cage 14. The centrifugal force is decreased as any of the mass of the cage 14, the angular velocity thereof, and the distance (radius) thereof from the rotation center is reduced. Accordingly, in the cage 14 in this disclosure, since the cage 14 is placed closer to the inner ring 11, the centrifugal force to be applied to the cage 14 can be further decreased.

Since the cage 14 is an inner ring guide cage, the gap between the pocket 30 and the ball 13 can be set to be wide as compared with a rolling element guide cage that is guided by balls (not shown). Accordingly, even when the cage prong 32 of the cage 14 elastically deforms due to the centrifugal force, the ball 13 partially makes contact with the pocket 30, thereby making it possible to prevent the cage 14 from being worn unevenly.

As illustrated in FIG. 6, the stiffening rib 40 is provided at a position closer to the inner side in the radial direction between the cage prong bodies 38. On this account, in comparison with a case where the stiffening rib 40 is provided at a position closer to the outer side in the radial direction, the volume of the lack portion 37 can be made large. This is because the circumferential length (see FIG. 5) between the cage prong bodies 38 in one cage prong 32 is small on a side closer to the inner side in the radial direction and is large on a side closer to the outer side in the radial direction. This heightens an effect to reduce the weight of the cage prong 32. Further, since the stiffening rib 40 is provided closer to the inner side in the radial direction, the distance (radius) of the stiffening rib 40 from the rotation center is small as compared with a case where the stiffening rib 40 is provided closer to the outer side in the radial direction. Accordingly, the centrifugal force to be applied to the stiffening rib 40 is decreased.

As illustrated in FIG. 4, the stiffening rib 40 includes the first rib portion 41 provided on the first side in the axial direction, and the second rib portions 42. The first rib portion 41 connects the annular body 31 to the cage prong bodies 38. The second rib portions 42 are provided at an interval in the circumferential direction so as to extend to the second side in the axial direction from the first rib portion 41 and are connected to the cage prong bodies 38.

With the configuration of the stiffening rib 40, a part between the second rib portions 42 is lacked, so that an increase in weight by the stiffening rib 40 can be restrained. Besides, the cage prong bodies 38 are connected to the annular body 31 via the first rib portion 41 and the second rib portions 42. On this account, the stiffening rib 40 can sufficiently have a function as a stiffener for the cage prong bodies 38. Further, the notch portion 43 is formed on the second side of the stiffening rib 40 in the axial direction. On this account, the weight of the cage prong 32 on the second side in the axial direction is particularly light, so that the cage prong 32 can hardly deform toward the outer ring 12 side by the centrifugal force.

Thus, with the rolling bearing 10 in this disclosure, the centrifugal force to be applied to the cage 14 can be decreased. Accordingly, the cage 14 can hardly elastically deform toward the outer ring 12 side by the centrifugal force. This makes it possible to prevent such a situation that part of the cage 14 locally makes contact with the outer ring 12 and the cage 14 is worn unevenly. Hereby, it is possible to achieve a longer operating life of the rolling bearing 10. Particularly, the rolling bearing 10 (the cage 14) in this disclosure is suitable for high speed rotation.

The embodiment described herein is just an example in all respects and is not limitative. The scope of the present disclosure is not limited to the above embodiment and includes all modifications made within a range equivalent to the configurations described in the scope of Claims. The above embodiment deals with a case where the rolling bearing is a deep groove ball bearing, but the rolling bearing may be an angular contact ball bearing.

What is claimed is:
1. A rolling bearing comprising:
an inner ring;
an outer ring;
a plurality of rolling elements provided between the inner ring and the outer ring; and
an annular cage in which the rolling elements are held at intervals in a circumferential direction of the cage, wherein:
the cage includes an annular body placed closer to a first side in an axial direction of the cage than the rolling elements, and a plurality of cage prongs provided to extend to a second side in the axial direction from the annular body;
each of the cage prongs includes a lack portion provided from a first side of the each of the cage prongs to a second side of the each of the cage prongs in the axial direction such that the lack portion is opened to the second side in the axial direction and along a radial direction of the cage, wherein:

each of the cage prongs includes a pair of cage prong bodies such that the cage prong bodies are provided on both sides of the lack portion in the circumferential direction and make contact with a corresponding one of the rolling elements; and a stiffening rib is provided between the cage prong bodies, the stiffening rib includes a first rib portion provided on the first side in the axial direction and connecting the annular body to the cage prong bodies, and a pair of second rib portions provided at an interval in the circumferential direction so as to extend to the second side in the axial direction from the first rib portion, the second rib portions being connected to the cage prong bodies.

2. The rolling bearing according to claim 1, wherein: the inner ring includes an inner ring raceway with which balls as the rolling elements make rolling contact;

and the cage includes guide portions configured to position the cage by making contact with the inner ring raceway.

3. The rolling bearing according to claim 1, wherein the stiffening rib is provided at a position closer to an inner side in the radial direction between the cage prong bodies.

4. A cage comprising:

an annular body placed closer to a first side in an axial direction of the cage than rolling elements provided in a rolling bearing; and a plurality of cage prongs provided to extend to a second side in the axial direction from the annular body, wherein:

each of the cage prongs includes a lack portion provided from a first side of the each of the cage prongs to a second side of the each of the cage prongs in the axial direction such that the lack portion is opened to the second side in the axial direction and along a radial direction of the cage;

each of the cage prongs includes a pair of cage prong bodies such that the cage prong bodies are provided on both sides of the lack portion in a circumferential direction of the cage and make contact with a corresponding one of the rolling elements; and a stiffening rib is provided between the cage prong bodies, the stiffening rib includes a first rib portion provided on the first side in the axial direction and connecting the annular body to the cage prong bodies, and a pair of second rib portions provided at an interval in the circumferential direction so as to extend to the second side in the axial direction from the first rib portion, the second rib portions being connected to the cage prong bodies.

* * * * *